United States Patent [19]

Kawase et al.

[11] 4,158,525
[45] Jun. 19, 1979

[54] METHOD OF AND APPARATUS FOR OPERATING PUMP TURBINE

[75] Inventors: Yozo Kawase, Yokohama; Makoto Fujisaki, Musashino, both of Japan

[73] Assignee: Tokyo Shibaura Denki Kabushiki Kaisha, Kawasaki, Japan

[21] Appl. No.: 872,007

[22] Filed: Jan. 24, 1978

[30] Foreign Application Priority Data

Jan. 31, 1977 [JP] Japan .................................. 52/9349

[51] Int. Cl.² .............................................. F01D 1/06
[52] U.S. Cl. ...................................... 415/1; 415/110; 415/500
[58] Field of Search ........................... 415/1, 500, 110

[56] References Cited

U.S. PATENT DOCUMENTS

| | | | |
|---|---|---|---|
| 3,174,719 | 3/1965 | Sproule et al. | 415/110 |
| 3,174,720 | 3/1965 | Sproule | 415/110 |
| 3,237,565 | 3/1966 | Hartland | 415/1 |
| 3,279,378 | 10/1966 | Sproule | 415/110 |
| 3,658,436 | 4/1972 | Oishi | 415/1 |
| 3,724,966 | 4/1973 | Sproule | 415/1 |
| 3,890,059 | 6/1975 | Takase | 415/1 |
| 3,945,754 | 3/1976 | Hagiya et al. | 415/1 |
| 3,985,464 | 10/1976 | Hachiya et al. | 415/1 |

*Primary Examiner*—C. J. Husar
*Attorney, Agent, or Firm*—Stevens, Davis, Miller & Mosher

[57] ABSTRACT

In a method of operating a pump turbine, compressed air is supplied into a runner chamber of the turbine and a leakage drain valve is opened of a guide vane at the time of starting the pump turbine to force downwardly the level of the water in the runner chamber and to rotate a runner of the pump turbine in air, the compressed air in the runner chamber is exhausted when the rotating speed of the runner reaches a rated speed for the pump operation, thus filling the runner chamber with water. The water containing a large quantity of dissolved oxygen and contained near the periphery of the runner is drained into a spillway through a pipe for draining water leakage through the guide vanes, priming pressure in the runner chamber is detected and a leakage drain valve in the drain pipe is closed after a predetermined time from the detection of the priming pressure.

2 Claims, 3 Drawing Figures

METHOD OF AND APPARATUS FOR OPERATING PUMP TURBINE

BACKGROUND OF THE INVENTION

This invention relates to an improved method of and apparatus for operating a pump turbine, and more particularly, a method in which the corrosion of elements of the pump turbine system caused by oxygen dissolved in water is effectively prevented.

It is known that in a pump turbine, compressed air is supplied into a runner chamber at the pumping-up starting time and the water level in the runner chamber is forced downwardly from the runner so as to start the turbine in air. After starting, when the rotating speed of the runner increases and reaches a rated speed, an exhaust valve is opened thereby exhausting the compressed air in the runner chamber. Simultaneously, the water level in the runner chamber increases and the runner chamber is filled with water to take place pump shut-off operation and after detecting the priming pressure in the runner chamber, the exhaust valve is closed.

Although it is of course necessary that the compressed air in the runner chamber should be completely exhausted at the time of completely closing the exhaust valve, actually, it is impossible to completely exhaust the air in the runner chamber because of the whirling flow caused by water or the shapes of the runner and the covers, and particularly, in a high-speed machine operating under a high head, the runner and the flow passage are constructed to be flat so that in an extreme case, it becomes impossible to exhaust the compressed air and therefore to start the pumping-up operation of the turbine. In such a case, a large quantity of the oxygen in the air remaining in the runner chamber will be dissolved in the water by the whirling flow caused by the rotation of the runner whereby the amount of the dissolved oxygen increases.

In the normal operation of a pump turbine, after the starting of the pump, guide vams are opened to start the pumping-up operation, so that water containing a large quantity of oxygen is discharged into a reservoir located above the pump turbine system through a penstock. Therefore, there is no problem of damaging the elements of the turbine system by, for example, corrosion caused by the dissolved oxygen.

However, the pump turbine is not always transferred to the pumping-up operation immediately after the disconnection of the generator from the power transmission system. In such case, the turbine is maintained in the inoperative state for an indefinite interval during which the surfaces of the runner, the upper and lower covers, the guide vanes, etc. may be corroded by the dissolved oxygen, which leads to the lowering of the running efficiency of the pump-water turbine.

In this connection, FIG. 1 shows a relationship between the concentration of oxygen dissolved in water and corrosion speed of the elements. As shown in FIG. 1, the corrosion speed increases linearly until the amount of the dissolved oxygen reaches nearly 1% by volume of water, but above nearly 1%, the corrosion speed decreases rapidly, but local corrosion begins to occur.

SUMMARY OF THE INVENTION

Accordingly, it is an object of this invention to provide an improved method of and apparatus for operating a pump turbine system for preventing corrosion of the surfaces of the elements of the system caused by the oxygen dissolved in water.

According to the invention of this application, in one aspect, there is provided a method of operating a pump turbine, wherein the method comprises the steps of supplying compressed air into a runner chamber of the turbine and opening a leakage drain valve of a guide vane at the time of starting the pump turbine to force downwardly the level of the water in the runner chamber and to rotate a runner of the pump turbine in air, exhausting the compressed air in the runner chamber when the rotating speed of the runner reaches a rated speed for pump operation, thus filling the runner chamber with water, draining water containing a large quantity of dissolved oxygen and contained near the periphery of the runner into a spillway through a pipe for draining water leaking through the guide vanes, detecting priming pressure in the runner chamber, and closing the leakage drain valve after a predetermined time from the detection of the priming pressure.

In another aspect of the invention, there is provided apparatus for operating a pump turbine wherein the apparatus comprises a turbine provided with guide vanes and a draft tube, valve means for supplying compressed air into a runner chamber of the pump turbine, at the time of starting the turbine as a pump, so as to force downwardly the level of the water in the runner chamber so as to rotate the runner in air, valve means for exhausting the compressed air in the runner chamber when the rotating speed of the runner reaches a rated speed for pump operation thus filling the chamber with water, a drain pipe for draining water containing a large quantity of dissolved oxygen and contained near the periphery of the runner into the draft tube, pressure detecting means for detecting priming pressure in the runner chamber, and a timer connected to the output of the detecting means for closing a valve in the drain pipe after a predetermined time.

BRIEF DESCRIPTION OF THE DRAWINGS

In the accompanying drawings.

DETAILED DESCRIPTION OF THE PREFERRED EMBODIMENT

The method of operating a pump turbine according to the present invention will be described hereinbelow with reference to FIGS. 2 through 4.

Figure 1:
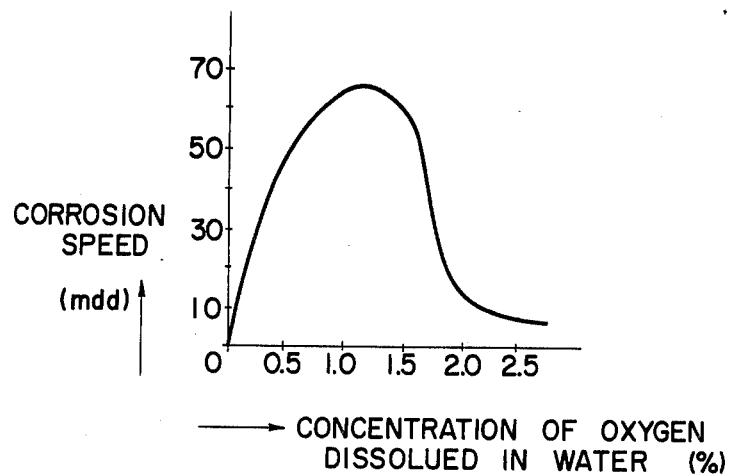
FIG. 1 is a graph showing the relationship between the concentration, in volume %, of the oxygen dissolved in water and the corrosion speed (mdd)
Figure 2:
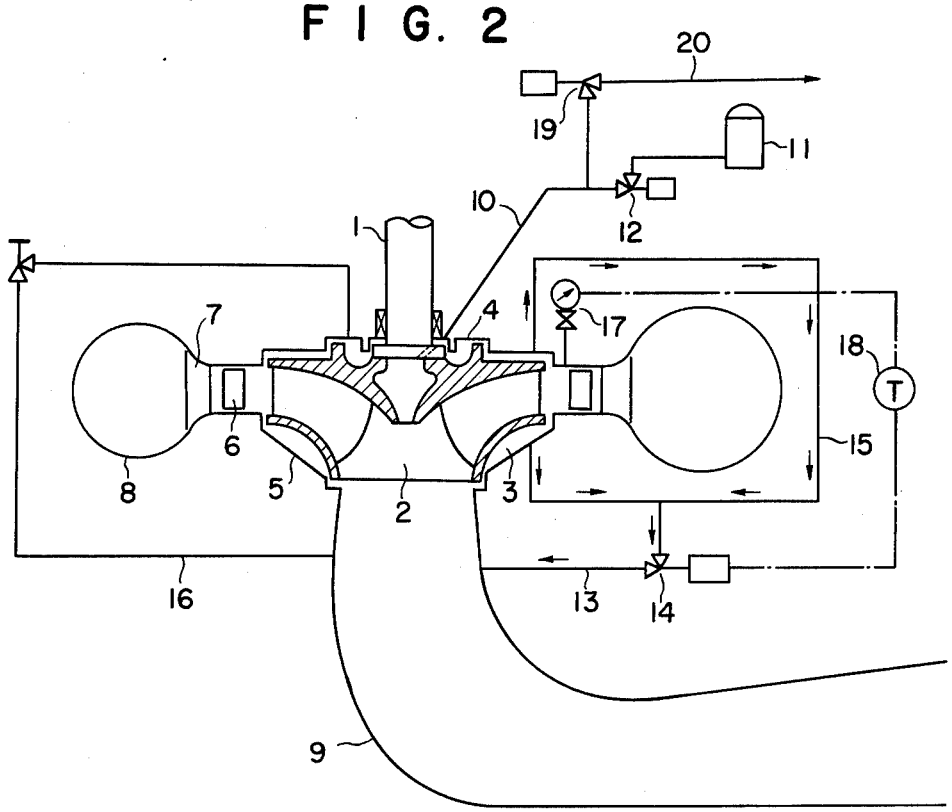
FIG. 2 is a diagrammatic cross-sectional view of a system to which the method of this invention is applied.
Figure 3:
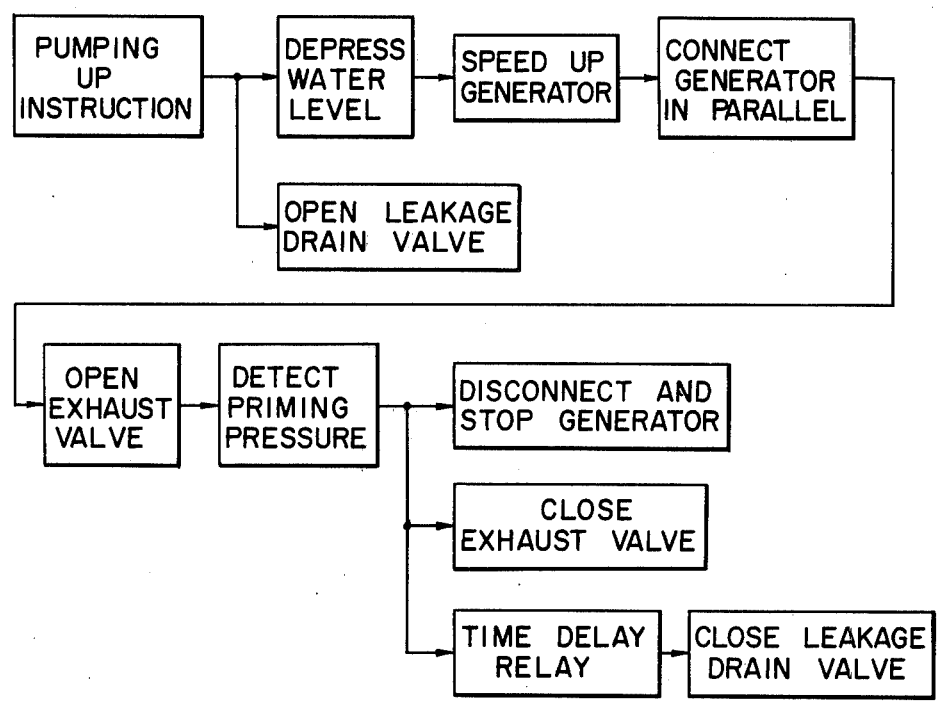
FIG. 3 is a flow chart showing the steps of the method of this invention.

FIG. 2 shows one example of a Francis type pump turbine, in which a runner 2 is attached to the lower end of a shaft 1. The runner 2 is rotatable in a runner chamber 3 which is surrounded by upper and lower covers 4 and 5. Guide vanes 6, stay vanes 7 and a spiral casing 8 are arranged radially outwardly of the runner chamber 3 in a known manner and a draft tube 9 is also provided below the runner chamber 3. To the upper cover 4 is attached a supply and exhaust pipe 10, one end of which is opened on the back side of the runner 2 and the other end is connected to a source 11 of compressed air and an exhaust pipe 20. Valves 12 and 19 for controlling the supply or discharge of the compressed air are provided at intermediate points of the pipe 10.

The lower cover 5 is connected to the draft tube 9 through a leakage drain pipe 13 containing a leakage drain valve 14. The upper and lower covers 4 and 5 are connected with each other through outer and inner balance pipes 15 and 16 so as to remove pressure difference therebetween.

The operation of the pump turbine to which the method according to this invention is applied will be described hereunder in conjunction with FIG. 3.

First, when a pumping-up instruction is given to the pump turbine, the guide vanes 6 are fully closed, and the leakage drain valve 14 is opened together with the supply valve 12. Then, the compressed air is supplied from the compressed air source 11 to the runner chamber 3 through the pipe 10 thereby forcing downwardly the water in the chamber 3 into the draft tube 9. The valve 12 is completely closed when the level of the water reaches a predetermined level below the runner 2.

Usually, a starting generator motor (not shown) is mounted on the shaft 1. The starting motor is now operated to start the pump under in air. As the runner speeds up to the rated speed, the generator is connected to the power system, and the starting operation is continued. During this step, the water leaked out from the guide vanes 6 to the runner chamber 3 is drained into the draft tube 9 through the leakage drain pipe 13.

On the next stage, when the exhaust valve 19 is opened to exhaust the compressed air in the runner chamber 3 into atmosphere through pipes 10 and 20, the water level below the runner 2 gradually goes upward by the atmoshperic pressure to fill the runner chamber with water thereby starting the shut-off operation. When pressure in the chamber 3 increases to a predetermined priming pressure, a time delay relay 18 including a timer is then energized and the leakage drain valve 14 is closed after the lapse of a time preset by the timer. It is advantageous to preset this time so that water containing a large quantity of oxygen and presenting near the periphery of the runner 2 will be completely forced out through the leakage drain pipe 13 into the draft tube 9.

Since one end of the pipe 13 opening through the lower cover 5 is usually positioned at a portion near the outer periphery of the runner, the pressure applied on the opened end is considerably high and there is a large pressure difference between this opening and the upper end of the draft tube 9 connected to the runner chamber 3, so that a large amount of water can be drained.

Thus, since the time for closing the leakage drain valve 14 is preset a predetermined time later than the time of detection of the priming pressure under the running condition of the pump turbine, water containing a large quantity of oxygen and contained in the runner chamber can be forced out into the spillway through the draft tube, thereby effectively preventing the corrosion of the surfaces of the runner, the upper and lower covers, the guide vanes etc. Furthermore, the life of the elements constituting the pump turbine system can be increased and the lowering of the operating efficiency of the runner caused by the corrison can be prevented.

Although in FIG. 2, the outlet end of the leakage drain pipe 13 is connected to the draft tube 9, it may be connected to the spillway.

We claim:

1. A method of operating a pump turbine comprising the steps of supplying compressed air into a runner chamber of said pump turbine and opening a leakage drain valve of a guide vane at the time of starting said pump turbine to force downwardly the level of the water in said runner chamber and to rotate a runner of said pump turbine in air, exhausting the compressed air in said runner chamber when the rotating speed of said runner reaches a rated speed for pump operation, thus filling said runner chamber with water, draining water containing a large quantity of dissolved oxygen and contained near the periphery of said runner into a spillway through a pipe for draining water leaking through said guide vanes, detecting priming pressure in said runner chamber, and closing said leakage drain valve after a predetermined time from the detection of the priming pressure.

2. A system for operating a pump turbine comprising a turbine provided with guide vanes and a draft tube, means for supplying compressed air into a runner chamber of said pump turbine at the time of starting the pump turbine as a pump so as to force downwardly the level of the water in said runner chamber in air, means for exhausting the compressed air in said runner chamber when the rotating speed of said runner reaches a rated speed for pump operation thus filling said runner chamber with water, a drain pipe for draining water containing a large quantity of dissolved oxygen and contained near the periphery of said runner into a draft tube, means for detecting priming pressure in said runner chamber, and a timer connected to the output of said detecting means for closing a valve in the drain pipe after a predetermined time.

* * * * *